(12) United States Patent  
Kashihara et al.

(10) Patent No.: US 9,469,492 B2  
(45) Date of Patent: Oct. 18, 2016

(54) TRANSFER DEVICE AND CARRIER SYSTEM WITH PAIR OF HOOKS

(71) Applicant: Murata Machinery, Ltd., Kyoto-shi, Kyoto (JP)

(72) Inventors: Masaki Kashihara, Inuyama (JP); Hiroyuki Kainuma, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/843,141

(22) Filed: Sep. 2, 2015

(65) Prior Publication Data

US 2016/0068372 A1    Mar. 10, 2016

(30) Foreign Application Priority Data

Sep. 8, 2014    (JP) ................................. 2014-182311

(51) Int. Cl.
| | |
|---|---|
| *B65G 1/06* | (2006.01) |
| *B65G 67/00* | (2006.01) |
| *B65G 1/04* | (2006.01) |
| *B25J 15/00* | (2006.01) |

(52) U.S. Cl.
CPC ............ *B65G 67/00* (2013.01); *B25J 15/0014* (2013.01); *B25J 15/0047* (2013.01); *B65G 1/0435* (2013.01); *B65G 1/0464* (2013.01); *B65G 1/06* (2013.01)

(58) Field of Classification Search
CPC .... B65G 1/06; B65G 1/0435; B25J 15/0014; B25J 15/0047
See application file for complete search history.

(56) References Cited

U.S. PATENT DOCUMENTS

| | | | | | |
|---|---|---|---|---|---|
| 3,630,402 | A | * | 12/1971 | Young ................ | B65G 1/0435 414/434 |
| 3,883,008 | A | * | 5/1975 | Castaldi .............. | B65G 1/0435 414/269 |
| 3,999,823 | A | * | 12/1976 | Di Liddo ............ | B65G 1/0435 312/268 |
| 4,116,324 | A | * | 9/1978 | Burmeister ......... | B65G 47/74 198/465.1 |
| 4,352,622 | A | * | 10/1982 | Wieschel ............ | B65G 1/0435 414/277 |
| 4,361,411 | A | * | 11/1982 | Di Liddo ............ | B65G 1/0435 414/280 |
| 4,656,949 | A | * | 4/1987 | Ragot ................. | B65G 21/10 104/172.1 |
| 5,199,840 | A | * | 4/1993 | Castaldi ............. | B65G 1/0435 414/807 |
| 5,833,427 | A | * | 11/1998 | Siegler ............... | B65G 1/0435 414/277 |
| 2013/0011230 | A1 | * | 1/2013 | Barry .................. | B61D 47/00 414/399 |

FOREIGN PATENT DOCUMENTS

| | | |
|---|---|---|
| JP | 0364923 A | 6/1991 |
| JP | 2012153508 A | 8/2012 |

\* cited by examiner

*Primary Examiner* — Gerald McClain  
(74) *Attorney, Agent, or Firm* — DLA Piper LLP (US)

(57) ABSTRACT

A transfer device that holds down a space occupied by a pair of hooks includes: a cargo placement part having a cargo placement surface for placing a cargo; a pair of hooks, each of which is rotated around a base end thereof between a protruding position where a tip thereof is engaged with a handle by protruding above the cargo placement surface and a retracting position where the tip thereof separates from the handle by retracting below the cargo placement surface. A slide arm moves the pair of hooks in the transferring direction with respect to the cargo placement part. When the pair of hooks is located in the retracting position, the hooks are arranged so as to be vertically superimposed by falling down sideways in a mutually approaching direction.

5 Claims, 9 Drawing Sheets

TRANSFER DEVICE AND CARRIER SYSTEM WITH PAIR OF HOOKS

CROSS-REFERENCE TO RELATED APPLICATIONS

This application claims the benefit of priority under 35 USC 119 of Japanese application no. 2014-182311, filed on Sep. 8, 2014, which is incorporated herein by reference.

BACKGROUND OF THE INVENTION

1. Field of the Invention

The present invention relates to a transfer device for transferring a cargo, and a carrier system provided with this device.

2. Description of the Related Art

There is known a carrier system for carrying and transferring a cargo by means of a carrier that travels along a rail arranged on the ceiling side. The carrier has a travelling vehicle that travels along a rail arranged on the ceiling side, and a lift stage that is lifted or lowered while being hung from the travelling vehicle. Below the rail, there is installed a rack arranged with a plurality of stages of storage shelves for storing cargos.

The lift stage is provided with a transfer device for transferring a cargo between the lift stage and the storage shelf (e.g., Unexamined Japanese Patent Publication No. 2012-153508). The conventional transfer device includes a cargo placement part for placing a cargo; a pair of forks each arranged on each side of the cargo placement part; and a pair of hooks each provided at a tip of each of the pair of forks.

For example, at the time of transferring a cargo from the storage shelf to the lift stage, first, each of the pair of forks moves forward along each side surface of the cargo placed on the storage shelf, and at the timing in which each of the pair of hooks gets over the rear surface of the cargo, each of the pair of hooks is rotated inward. Subsequently, with each of the pair of hooks being caught on the rear surface of the cargo, each of the pair of forks moves backward, and the cargo is thereby transferred from the storage shelf to the cargo placement part of the lift stage.

However, in the foregoing conventional transfer device, a space occupied by the pair of forks is relatively large, thereby causing restrictions on a space for placing a cargo on the cargo placement part, which is problematic.

BRIEF SUMMARY OF THE INVENTION

The present invention is intended to solve the foregoing problem, and has an object to provide a transfer device capable of holding down a space occupied by a pair of hooks, and a carrier system provided with this transfer device.

In order to achieve the above object, a transfer device according to one aspect of the present invention is a transfer device for transferring a cargo in a transferring direction, the cargo having an engaged part on a side surface thereof. The device includes: a cargo placement part having a cargo placement surface for placing the cargo; a pair of hooks, each of which is rotated around a base end thereof between a protruding position where a tip thereof is engaged with the engaged part by protruding above the cargo placement surface and a retracting position where the tip thereof separates from the engaged part by retracting below the cargo placement surface; and a movement mechanism which moves the pair of hooks in the transferring direction with respect to the cargo placement part. When the pair of hooks is located in the retracting position, the hooks are arranged so as to be vertically superimposed by falling down sideways in a mutually approaching direction.

According to this aspect, when the pair of hooks is located in the retracting position, the hooks are arranged so as to be vertically superimposed by falling down sideways in the mutually approaching direction. Hence it is possible to hold down a space occupied by the pair of hooks. As a result, it is possible to ensure a space for placing a cargo on the cargo placement part, so as to transfer even a cargo having a relatively small size.

A transfer device according to another aspect of the present invention may be configured such that the tip of each of the pair of hooks is bent stepwise in the transferring direction more than the base end of each of the pair of hooks.

According to this aspect, the tip of each of the pair of hooks is bent stepwise in the transferring direction more than the base end of each of the pair of hooks. Therefore, when each of the pair of hooks is located in the retracting position, it is possible to suppress mutual interference of the pair of hooks. As a result, it is possible to reduce an arrangement interval between the pair of hooks, so as to further hold down the space occupied by the pair of hooks.

A transfer device according to another aspect of the present invention maybe configured such that a bulging part that bulges toward a direction substantially perpendicular to the transferring direction is provided at the tip of each of the pair of hooks, and when each of the pair of hooks is located in the retracting position, the bulging part of the hook superimposed on the lower side is arranged facing upward, and the bulging part of the hook superimposed on the upper side is arranged facing downward.

According to this aspect, the bulging part that bulges toward the direction substantially perpendicular to the transferring direction is provided at the tip of each of the pair of hooks. Hence it is possible to stably engage the tip of each of the pair of hooks with the engaged part of the cargo. Further, when each of the pair of hooks is located in the retracting position, the bulging part of the hook superimposed on the lower side is arranged facing upward, and the bulging part of the hook superimposed on the upper side is arranged facing downward. Therefore, despite provision of the bulging part at the tip of each of the pair of hooks, it is possible to hold down the space occupied by the pair of hooks.

A transfer device according to another aspect of the present invention may further include a controller which controls rotation of each of the pair of hooks, and may be configured such that at the time of rotating each of the pair of hooks from the retracting position to the protruding position, the controller starts rotation of the hook superimposed on the lower side at the timing in which a predetermined time has elapsed after starting rotation of the hook superimposed on the upper side.

According to this aspect, at the time of rotating each of the pair of hooks from the retracting position to the protruding position, the controller starts rotation of the hook superimposed on the lower side at the timing in which the predetermined time elapses after starting rotation of the hook superimposed on the upper side. Hence it is possible to suppress mutual interference of the pair of hooks at the time of rotation.

A carrier system according to one aspect of the present invention includes: a rail arranged on a ceiling side; a carrier having a travelling vehicle that travels along the rail, and a lift stage that is lifted or lowered while being hung from the travelling vehicle; a rack, a cargo being transferred between the rack and the lift stage; and any of the foregoing transfer devices, which is provided on the lift stage and configured to place the cargo between the lift stage and the rack. Two sets of pairs of hooks of the transfer device are provided, and the two sets of pairs of hooks are respectively arranged movably on both the right and left sides of the lift stage.

According to this aspect, when the pair of hooks is located in the retracting position, the hooks are arranged so as to be vertically superimposed by falling down sideways in a mutually approaching direction. Hence it is possible to hold down the space occupied by the pair of hooks. As a result, it is possible to ensure a space for placing a cargo on the cargo placement part, so as to transfer even a cargo having a relatively small size. Further, since the two sets of pairs of hooks of the transfer device are respectively arranged movably on both the right and left sides of the lift stage, it is possible to smoothly transfer the cargo between the lift stage and the rack.

According to the transfer device the present invention, it is possible to hold down the space occupied by the pair of hooks.

DETAILED DESCRIPTION OF PREFERRED EMBODIMENT

Hereinafter, an embodiment of the present invention will be described in detail by use of the drawings. It is to be noted that any embodiment described below shows a comprehensive or specific example. Numerical values, shapes, materials, constituents, arranged positions and a connection configuration of the constituents, steps, a sequence of the steps, and the like shown in the following embodiment are one example, and not intended to restrict the present invention.

Embodiment

1. Configuration of Carrier System

First, a configuration of a carrier system 4 mounted with a transfer device 2 according to one embodiment of the invention will be described with reference to FIGS. 1 to 3.

Figure 1:
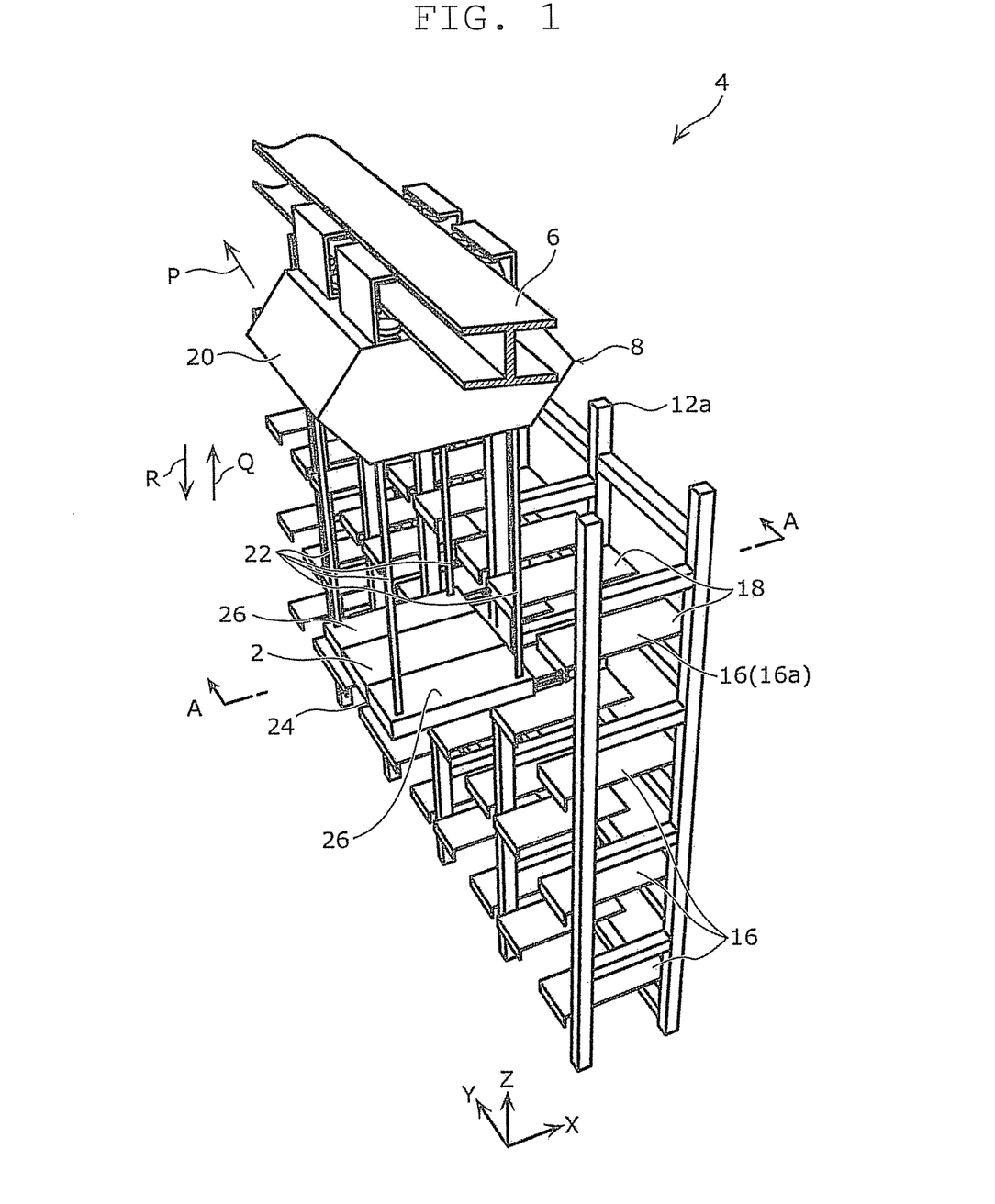
FIG. 1 is a perspective view illustrating a configuration of a carrier system mounted with a transfer device according to one embodiment of the invention.

FIG. 1 is a perspective view illustrating a configuration of the carrier system 4 mounted with the transfer device 2 according to the embodiment. FIG. 2 is an enlarged perspective view illustrating a lift stage 24 and a cargo 10 of FIG. 1. FIG. 3 is a sectional view of the lift stage 24 and the cargo 10 along a line A-A in FIG. 1.

As illustrated in FIG. 1, the carrier system 4 carries a cargo 10 (cf. FIGS. 2 and 3) by means of a carrier 8 that travels along a rail 6 arranged on the ceiling side in an automatic warehouse or the like, for example. Then, the cargo 10 is transferred between the carrier 8 and a rack 12a (or a rack 12b). As illustrated in FIGS. 2 and 3, handles 14a and 14b (engaged parts) are provided on a front surface 10a (a side surface) and a rear surface 10b (a side surface) of the cargo 10, respectively. A sectional shape of each of the handles 14a and 14b is formed to be a substantially L-shape.

The rail 6 is arranged while being hung from the ceiling of the automatic warehouse or the like, for example. The rail 6 extends linearly in a Y-axis direction, for example.

Racks 12a and 12b are equipment for keeping a plurality of cargos 10, and installed on the ground side below the rail 6. As illustrated in FIG. 3, each of the racks 12a and 12b is arranged on each side of the rail 6, and arranged along a travelling direction (a Y-axis direction) of the carrier 8. In each of the racks 12a and 12b, storage shelves 16 for storing the cargos 10 are arranged on a plurality of stages in a vertical direction (a Z-axis direction) and on a plurality of columns in a horizontal direction (the Y-axis direction). As illustrated in FIGS. 1 to 3, a pair of shelf plates 18 for supporting the cargo 10 from below is arranged on each of the storage shelves 16. The pair of shelf plates 18 is arranged at an interval in the Y-axis direction, for example.

As illustrated in FIG. 1, the carrier 8 has a travelling vehicle 20, a plurality of (four in the present embodiment) hanging members 22, and the lift stage 24.

The travelling vehicle 20 travels, while being hung on the rail 6, in a direction shown by an arrow P in FIG. 1 along the rail 6. Inside the travelling vehicle 20, there is mounted a travelling motor that serves as a driving source for travelling the travelling vehicle 20. The foregoing travelling motor is driven by electric power supplied via a power feeder wired along the rail 6. It is to be noted that a storage battery may be mounted inside the travelling vehicle 20 and electric power from this storage battery may be supplied to the travelling motor.

Inside the travelling vehicle 20, there are further mounted a drum and a lifting motor. Each of the plurality of hanging members 22 is wound around the drum. The drum is rotated in an unwinding or winding direction by the lifting motor. When the drum is rotated in the unwinding direction, each of the plurality of hanging members 22 being wound around the drum is unwound from the drum. On the other hand, when the drum is rotated in the winding direction, each of the plurality of hanging members 22 is wound onto the drum. The plurality of hanging members 22 are each unwound from or wound onto the drum as thus described, and the lift stage 24 is thereby lifted or lowered in the vertical direction.

The plurality of hanging members 22 are configured to hang the lift stage 24 from the travelling vehicle 20. One end of each of the plurality of hanging members 22 is coupled with the drum of the travelling vehicle 20, and the other end thereof is coupled with each of four corners of the lift stage 24. Each of the plurality of hanging members 22 is a metal wire, chain, belt or the like, for example.

The lift stage 24 is a stage in a substantially rectangular shape for placing the cargo 10. The lift stage 24 is liftably hung from the travelling vehicle 20 by the plurality of hanging members 22. When each of the plurality of hanging members 22 is wound onto the drum of the travelling vehicle 20, the lift stage 24 is raised in a direction shown by an arrow Q in FIG. 1. When each of the plurality of hanging members 22 is unwound from the drum of the travelling vehicle 20, the lift stage 24 is lowered in a direction shown by an arrow R in FIG. 1. The transfer device 2 for transferring the cargo 10 between the storage shelf 16 of the rack 12a (or the rack 12b) and the lift stage 24 is arranged on the lift stage 24. A configuration of the transfer device 2 will be described below.

2. Configuration of Transfer Device

Figure 4:
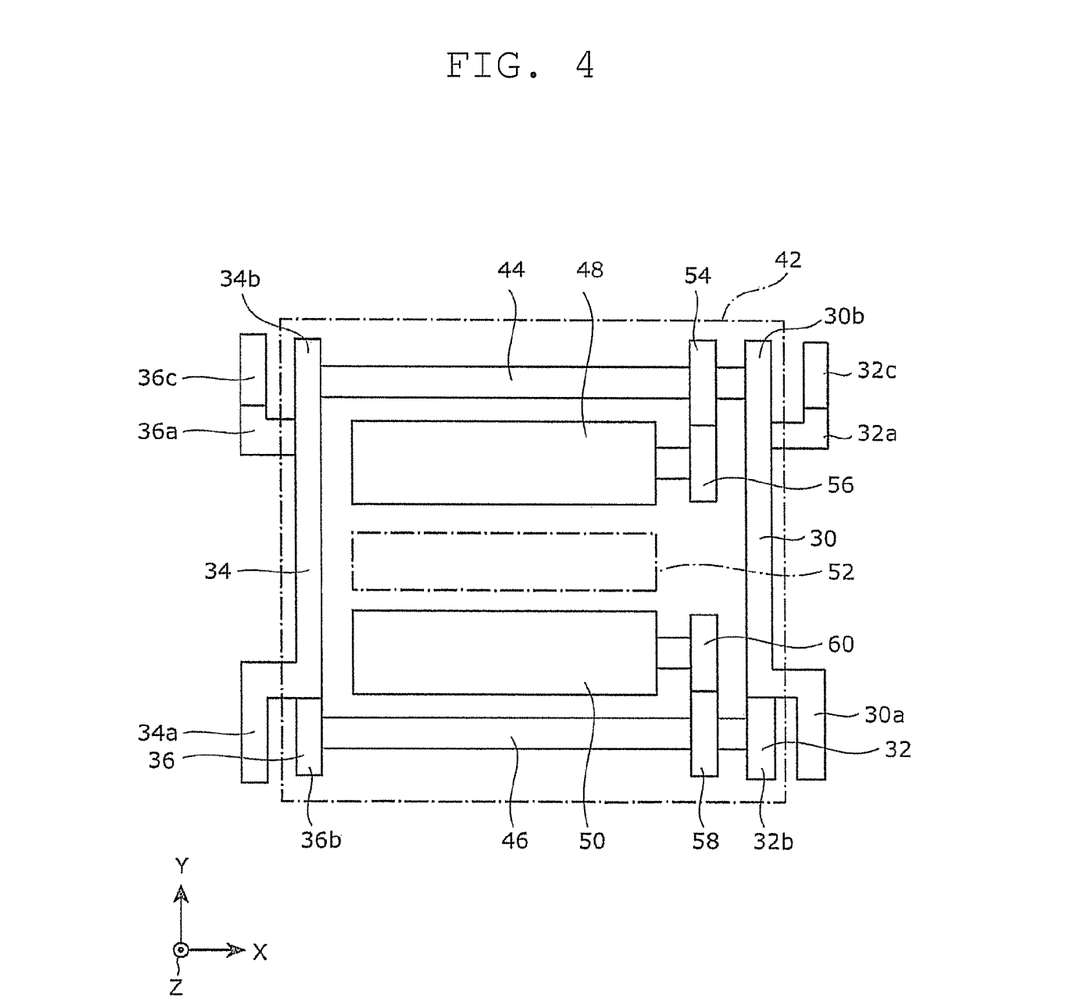
FIG. 4 is a view illustrating an internal mechanism of a top part of a slide arm.
Figure 5:
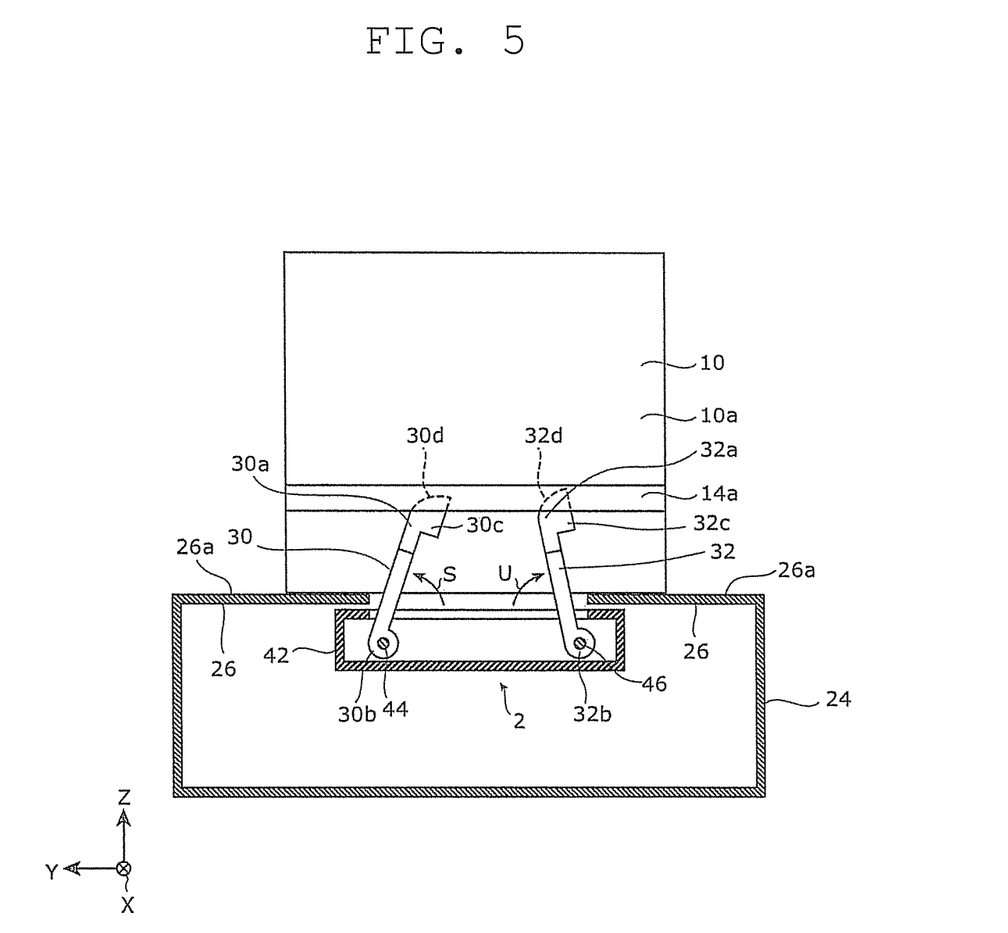
FIG. 5 is a sectional view of the lift stage along a line B-B in FIG. 2 in a state where each of the pair of hooks is located in a protruding position.
Figure 6:
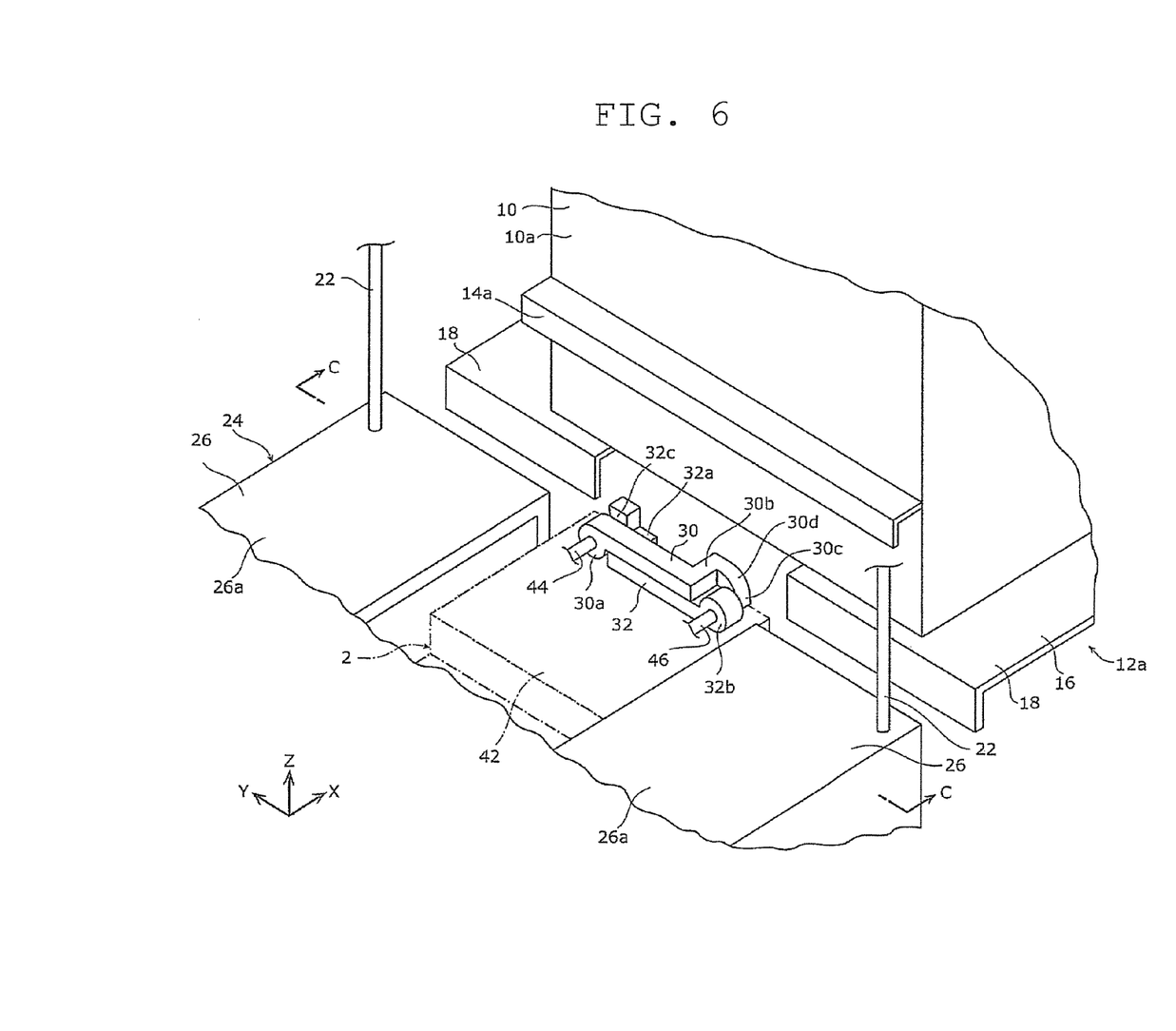
FIG. 6 is an enlarged perspective view illustrating the lift stage and the cargo of FIG. 1 in a state where each of the pair of hooks is located in a retracting position.
Figure 7:
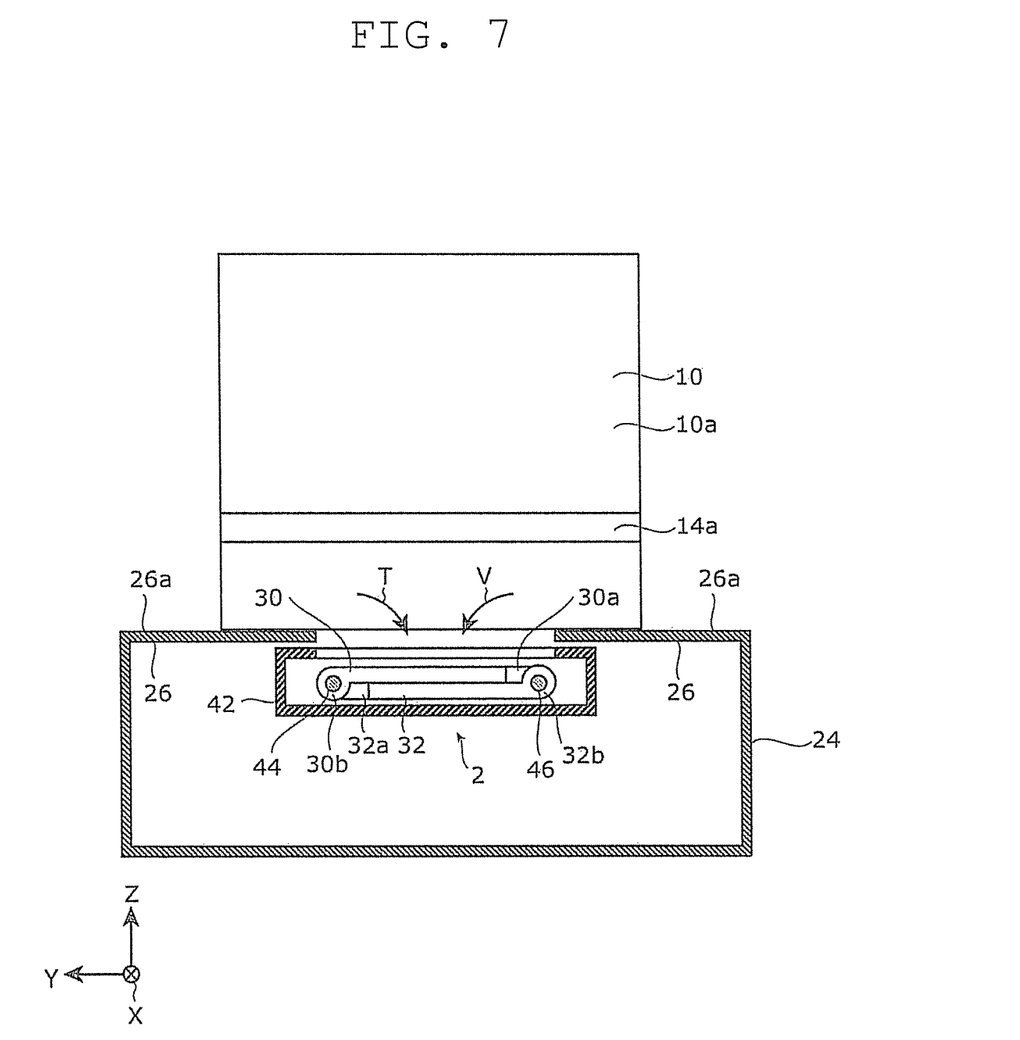
FIG. 7 is a sectional view of the lift stage along a line C-C in FIG. 6 in a state where each of the pair of hooks is located in the retracting position.

Next, the configuration of the foregoing transfer device 2 will be described with reference to FIGS. 2 to 7. FIG. 4 is a view illustrating an internal mechanism of a top part 42 of a slide arm 28. FIG. 5 is a sectional view of the lift stage 24 along a line B-B in FIG. 2 in a state where each of the pair of hooks 30 and 32 is located in a protruding position. FIG. 6 is an enlarged perspective view illustrating the lift stage 24 and the cargo 10 of FIG. 1 in a state where each of the pair of hooks 30 and 32 is located in a retracting position. FIG. 7 is a sectional view of the lift stage 24 along a line C-C in FIG. 6 in a state where each of the pair of hooks 30 and 32 is located in the retracting position.

Figure 2:
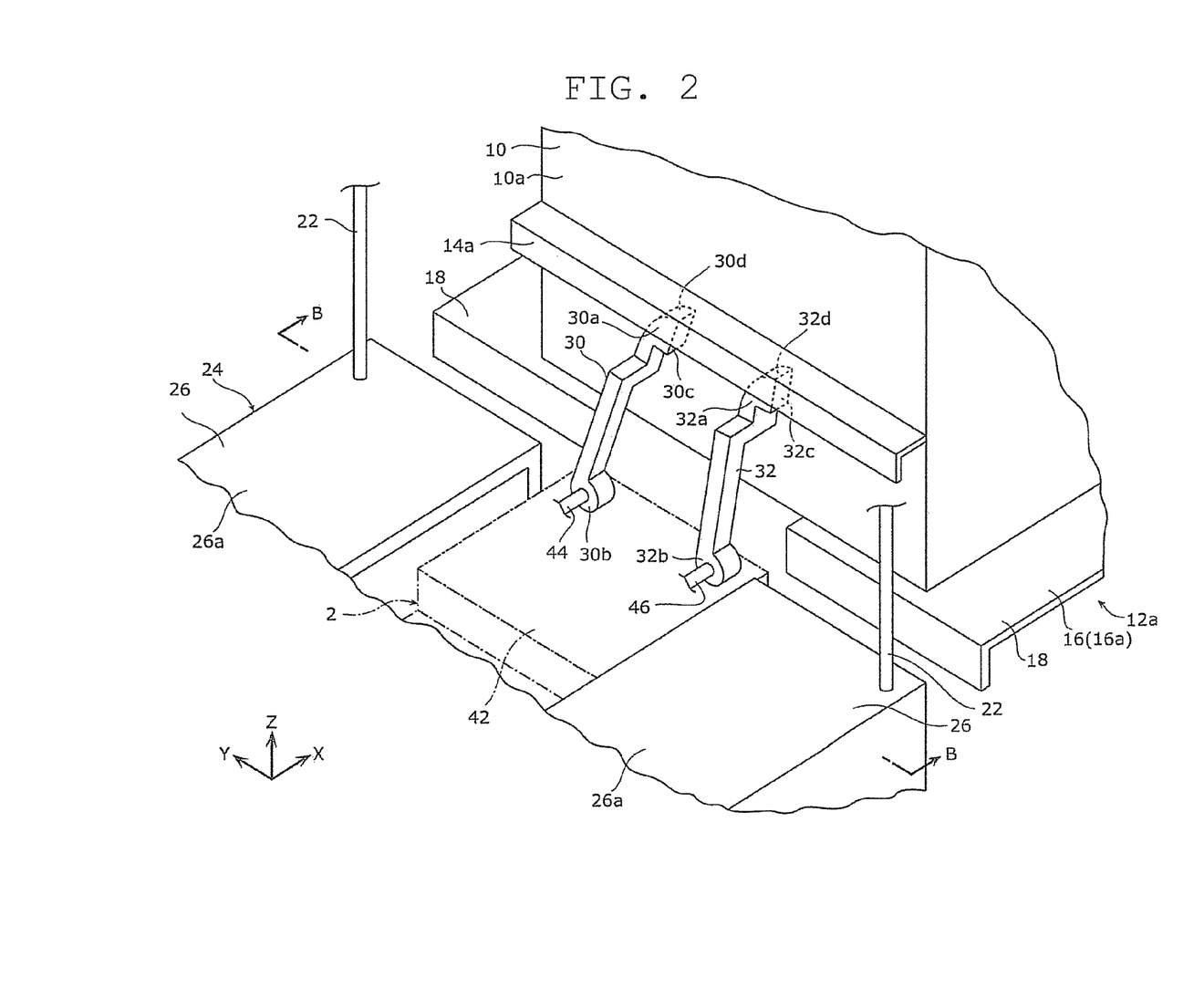
FIG. 2 is an enlarged perspective view illustrating a lift stage and a cargo of FIG. 1.
Figure 3:
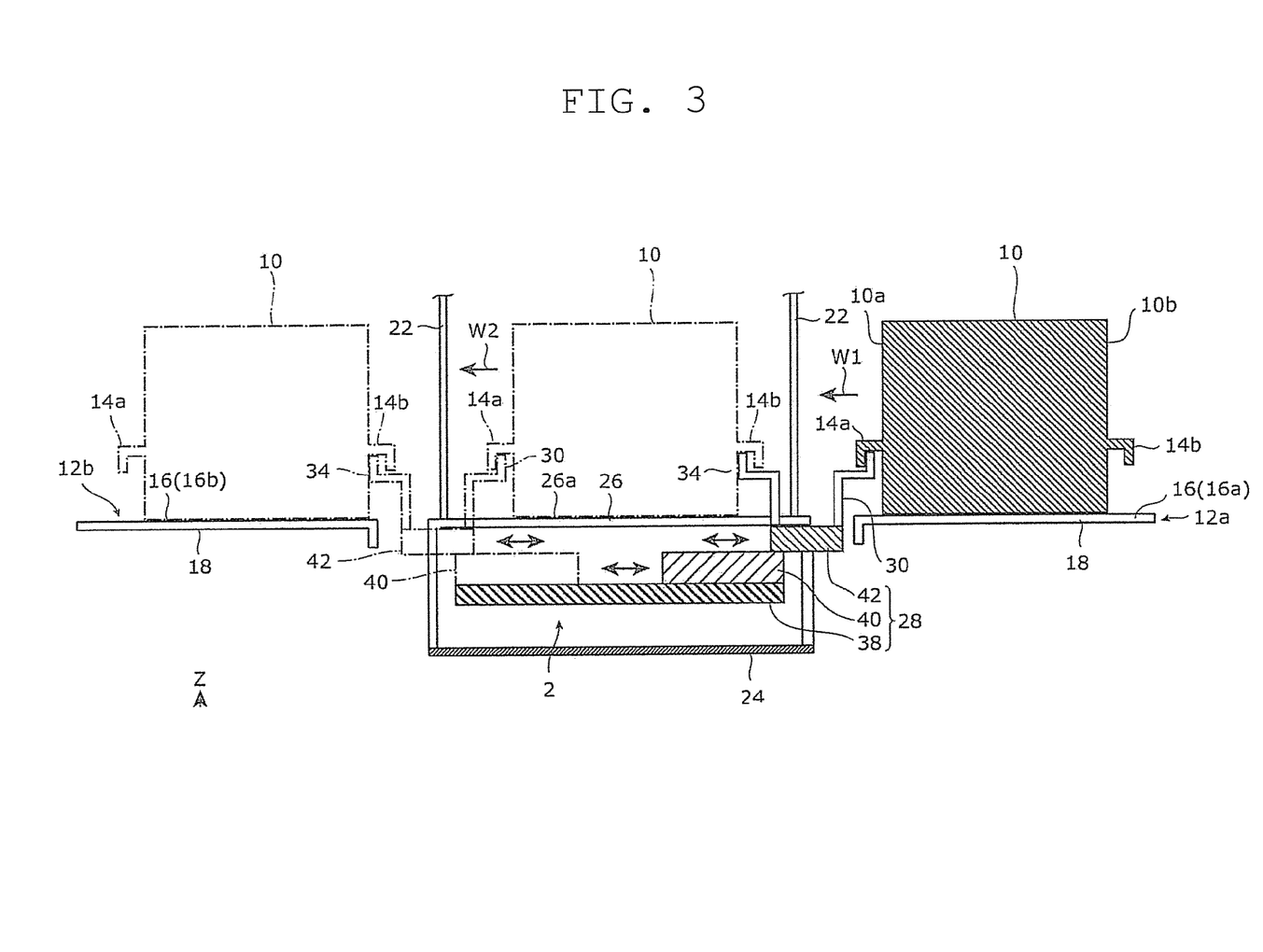
FIG. 3 is a sectional view of the lift stage and the cargo along a line A-A in FIG. 1

As illustrated in FIGS. 2 and 3, the transfer device 2 includes a pair of cargo placement parts 26, the slide arm 28 (movement mechanism), and a plurality of hooks 30, 32, 34 and 36.

The pair of cargo placement parts 26 is formed in the shape of a table, and arranged at the top end of the lift stage 24. The pair of cargo placement parts 26 is arranged at an interval in the Y-axis direction, for example. On the top surface of each of the pair of cargo placement parts 26, a cargo placement surface 26a for placing the cargo 10 is formed. It is to be noted that the cargo placement surface 26a is arranged horizontally (on an X-Y plane).

The slide arm 28 is arranged below the pair of cargo placement parts 26 in a region between the pair of cargo placement parts 26. The slide arm 28 has a base part 38, a middle part 40 and the top part 42. The base part 38 is fixed with respect to the lift stage 24 and extends in an X-axis direction. The middle part 40 is supported slidably in the X-axis direction with respect to the base part 38. The top part 42 is supported slidably in the X-axis direction with respect to the middle part 40. By a driving motor mounted on the lift stage 24, the middle part 40 slides in the X-axis direction with respect to the base part 38 and the top part 42 slides in the X-axis direction with respect to the middle part 40. Thereby, as illustrated in FIG. 3, the top part 42 comes to reciprocate in the X-axis direction between a position in the vicinity of the rack 12a (a position shown by a solid line in FIG. 3) and a position in the vicinity of the rack 12b (a position shown by a dashed line in FIG. 3). With this, the plurality of hooks 32 to 36 mounted on the top part 42 reciprocate in the transferring direction of the cargo 10 (the X-axis direction) with respect to the pair of cargo placement parts 26.

As illustrated in FIGS. 2 to 4, the plurality of hooks 30 to 36 are mounted on the top part 42. The pair of hooks 30 and 32 is arranged at one end of the top part 42 in the X-axis direction, and arranged at an interval in the Y-axis direction. The pair of hooks 34 and 36 is arranged at the other end of the top part 42 in the X-axis direction, and arranged at an interval in the Y-axis direction. That is, the two sets of pairs: one pair of hooks 30 and 32 and one pair of hooks 34 and 36, are respectively arranged movably on both the right and left sides (each side in the X-axis direction) of the lift stage 24.

The shape of the hook 30 is formed to be a crank shape as a whole. That is, a tip 30a of the hook 30 is bent stepwise in the transferring direction of the cargo 10 more than a base end 30b of the hook 30 (an end on the opposite side to the tip 30a). Further, a bulging part 30c that bulges toward a direction substantially perpendicular to the transferring direction of the cargo 10 (the Y-direction) is provided at the tip 30a of the hook 30. Moreover, out of the tip 30a of the hook 30, a region to be engaged with the handle 14a (or the handle 14b) of the cargo 10 is formed with an R-surface 30d.

Similarly to the hook 30, the shape of the hook 32 is formed to be a crank shape as a whole. That is, a tip 32a of the hook 32 is bent stepwise in the transferring direction of the cargo 10 more than a base end 32b of the hook 32. A bulging part 32c that bulges toward a direction substantially perpendicular to the transferring direction of the cargo 10 is provided at the tip 32a of the hook 32. Moreover, out of the tip 32a of the hook 32, a region to be engaged with the handle 14a (or the handle 14b) of the cargo 10 is formed with an R-surface 32d.

The shape of the hook 34 is symmetrical to the shape of the hook 30 with respect to the Y-axis, and the shape of the hook 36 is symmetrical to the shape of the hook 32 with respect to the Y-axis. For example, a bulging part is provided at a tip 34a of the hook 34, and a bulging part 36c (cf. FIG. 4) is provided at a tip 36a of the hook 36.

As illustrated in FIG. 4, inside the top part 42, there are further mounted a pair of shafts 44 and 46, a pair of driving motors 48 and 50, and a controller 52. Although the controller 52 is arranged inside the top part 42 in the present embodiment, this is not restrictive, and the controller 52 can be arranged in an arbitrary place. For example, the controller 52 may be arranged on the side surface of the lift stage 24.

The shaft 44 is rotatably supported inside the top part 42. The shaft 44 extends in the X-axis direction, and couples the base end 30b of the hook 30 and the base end 34b of the hook 34 to each other. The shaft 44 is fixed with a gear 54.

The driving motor 48 is rotated forward or backward around an X-axis. The driving motor 48 is fixed with a gear 56 meshed with the gear 54 of the shaft 44. Rotation of the driving motor 48 is transmitted to the shaft 44 via the gears 56 and 54. By rotation of the shaft 44, the hooks 30 and 34 are rotated interlockingly around the base ends 30b and 34b, respectively.

The controller 52 controls rotation of the driving motor 48. When the driving motor 48 is rotated forward, each of the hooks 30 and 34 is rotated interlockingly in a direction shown by an arrow S in FIG. 5 from the retracting position (cf. FIGS. 4, 6 and 7) to the protruding position (cf. FIGS. 2, 3 and 5). On the other hand, when the driving motor 48 is rotated backward, each of the hooks 30 and 34 is rotated interlockingly from the protruding position to the retracting position in a direction shown by an arrow T in FIG. 7.

The shaft 46 is rotatably supported inside the top part 42. The shaft 46 extends in the X-axis direction, and the base end 32b of the hook 32 and the base end 36b of the hook 36 are coupled with each other. The shaft 46 is fixed with a gear 58.

The driving motor 50 is rotated forward or backward around the X-axis. The driving motor 50 is fixed with a gear 60 meshed with the gear 58 of the shaft 46. Rotation of the driving motor 50 is transmitted to the shaft 46 via the gears 60 and 58. By rotation of the shaft 46, the hooks 32 and 36 are rotated interlockingly around the base ends 32b and 36b, respectively.

The controller 52 controls rotation of the driving motor 50. When the driving motor 50 is rotated forward, each of the hooks 32 and 36 is rotated from the retracting position to the protruding position in a direction shown by an arrow U in FIG. 5. On the other hand, when the driving motor 50 is rotated backward, each of the hooks 32 and 36 is rotated from the protruding position to the retracting position in a direction shown by an arrow V in FIG. 7.

3. Operation of Pair of Hooks

Next, an operation of the pair of hooks 30 and 32 will be described with reference to FIG. 2 to FIGS. 8A to 8D. FIGS. 8A to 8D are views for explaining the operation of the pair of hooks 30 and 32. It is to be noted that an operation of the pair of hooks 34 and 36 is similar to the operation of the pair of hooks 30 and 32, and hence a description thereof will be omitted.

As described above, each of the pair of hooks 30 and 32 is rotated between the protruding position and the retracting position around the base ends 30b and 32b.

As illustrated in FIGS. 2, 3 and 5, when each of the pair of hooks 30 and 32 is located in the protruding position, each of the pair of hooks 30 and 32 protrudes above the cargo placement surface 26a. Thereby, each of the tips 30a and 32a of each of the pair of hooks 30 and 32 comes to be engaged with the handle 14a (or the handle 14b) of the cargo 10 from below.

On the other hand, as illustrated in FIGS. 4, 6 and 7, when each of the pair of hooks 30 and 32 is located in the retracting position, each of the pair of hooks 30 and 32 is arranged so as to be vertically superimposed by falling down sideways in a mutually approaching direction, and retracted below the cargo placement surface 26a. Thereby, each of the tips 30a and 32a of each of the pair of hooks 30 and 32 comes to separate from the handle 14a (or the handle 14b) of the cargo 10. At this time, as illustrated in FIG. 6, the bulging part 32c of the hook 32 superimposed on the lower side is arranged facing upward, and the bulging part 30c of the hook 30 superimposed on the upper side is arranged facing downward.

Figure 8A:
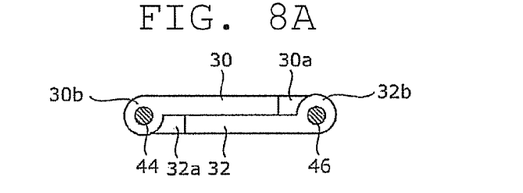
FIGS. 8A to 8D are views for explaining an operation of the pair of hooks.
Figure 8B:
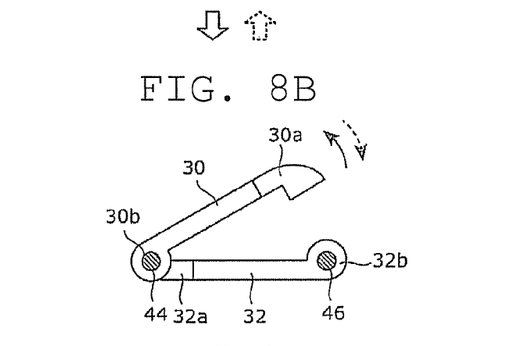
Figure 8C:
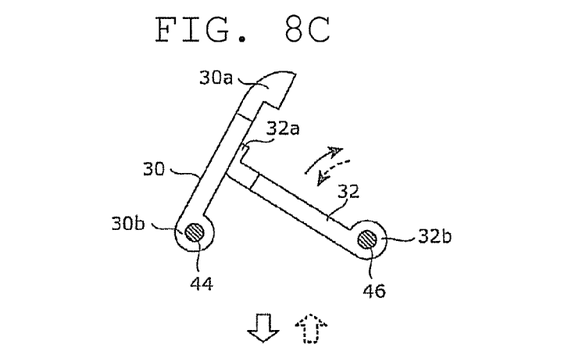
Figure 8D:
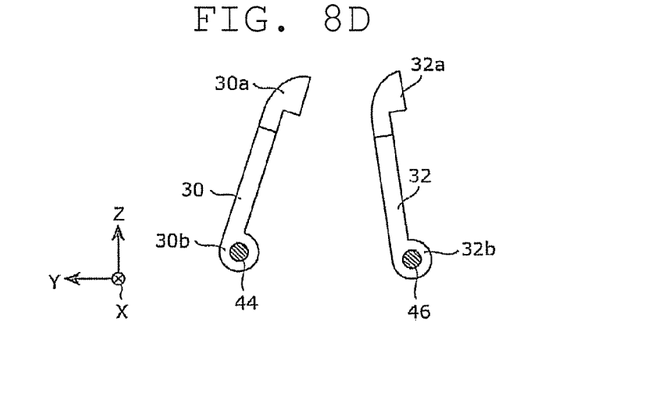

At the time when each of the pair of hooks 30 and 32 is rotated from the retracting position to the protruding position, the controller 52 delays the timing for starting rotation of the driving motor 50 from the timing for starting rotation of the driving motor 48. As illustrated in FIG. 8A, the controller 52 starts forward rotation of the driving motor 48 from a state where each of the pair of hooks 30 and 32 is located in the retracting position. Thereby, as illustrated in FIG. 8B, the hook 30 superimposed on the upper side starts its rotation from the retracting position toward the protruding position. Subsequently, at the timing in which a predetermined time (e.g., about several seconds) has elapsed after starting rotation of the hook 30 superimposed on the upper side, the controller 52 starts forward rotation of the driving motor 50. Thereby, as illustrated in FIG. 8C, the hook 32 superimposed on the lower side starts its rotation from the retracting position toward the protruding position. Subsequently, the controller 52 stops rotation of the driving motor 48 at the timing in which the hook 30 is located in the protruding position, and then stops rotation of the driving motor 50 at the timing in which the hook 32 is located in the protruding position. Accordingly, as illustrated in FIG. 8D, each of the pair of hooks 30 and 32 comes to be located in the protruding position.

On the other hand, at the time when each of the pair of hooks 30 and 32 is rotated from the protruding position to the retracting position, the controller 52 delays the timing for starting rotation of the driving motor 48 from the timing for starting rotation of the driving motor 50. As illustrated in FIG. 8D, the controller 52 starts backward rotation of the driving motor 50 from the state where each of the pair of hooks 30 and 32 is located in the protruding position. Thereby, as illustrated in FIG. 8C, the hook 32 starts its rotation from the protruding position toward the retracting position. Subsequently, at the timing in which a predetermined time (e.g., about several seconds) has elapsed after starting rotation of the hook 32, the controller 52 starts backward rotation of the driving motor 48. Thereby, as illustrated in FIG. 8B, the hook 30 starts its rotation from the protruding position toward the retracting position. Subsequently, the controller 52 stops rotation of the driving motor 50 at the timing in which the hook 32 is located in the retracting position, and then stops rotation of the driving motor 48 at the timing in which the hook 30 is located in the retracting position. Accordingly, as illustrated in FIG. 8A, each of the pair of hooks 30 and 32 comes to be located in the retracting position.

4. Method for Transferring Cargo

Next, a method for transferring the cargo 10 by the foregoing transfer device 2 will be described with reference to FIGS. 1 to 3 and FIGS. 5 to 7.

As illustrated in FIG. 1, for example at the time of carrying the cargo 10 out of a specific storage shelf 16a of the rack 12a, first, the lift stage 24 is lowered to a height corresponding to the specific storage shelf 16a while the travelling vehicle 20 is made to travel to a position corresponding to the specific storage shelf 16a along the rail 6. At this time, as illustrated in FIGS. 6 and 7, each of the plurality of hooks 30 to 36 is located in the retracting position. Next, while travelling of the travelling vehicle 20 is stopped in the above position, the top part 42 of the slide arm 28 is moved from a standby position to the position in the vicinity of the rack 12a in a state where lifting or lowering of the lift stage 24 is stopped at the above height. Subsequently, as illustrated in FIGS. 2, 3 and 5, each of the plurality of hooks 30 to 36 is rotated from the retracting position to the protruding position. Thereby, each of the tips 30a and 32a of each of the pair of hooks 30 and 32 comes to be engaged with the handle 14a of the cargo 10 placed on the specific storage shelf 16a.

From this state, the top part 42 of the slide arm 28 is moved from the position in the vicinity of the rack 12a to the position in the vicinity of the rack 12b, and hence the cargo 10 comes to be pulled in the X-axis direction by the pair of hooks 30 and 32. Thereby, as shown by an arrow W1 in FIG. 3, the cargo 10 is transferred, while being dragged, from the specific storage shelf 16a to the pair of cargo placement parts 26 of the lift stage 24. It is to be noted that, when transferring of the cargo 10 is completed, after each of the plurality of hooks 30 to 36 has been rotated from the protruding position to the retracting position, the top part 42 of the slide arm 28 is returned to the standby position. Subsequently, while the lift stage 24 is raised to the vicinity of the travelling vehicle 20, travelling of the travelling vehicle 20 is started.

On the other hand, as illustrated in FIG. 3, for example at the time of carrying the cargo 10 onto the specific storage shelf 16b of the rack 12b, first, the travelling vehicle 20 is made to travel to a position corresponding to the specific storage shelf 16b along the rail 6 in a state where the lift stage 24 on which the cargo 10 is placed has been raised to the vicinity of the travelling vehicle 20. At this time, each of the plurality of hooks 30 to 36 is located in the retracting position. Next, the lift stage 24 is lowered to a height corresponding to the specific storage shelf 16b while the travelling vehicle 20 is made to travel to the above position. While travelling of the travelling vehicle 20 is stopped in the above position, the top part 42 of the slide arm 28 is moved from the standby position to the position in the vicinity of the rack 12a in a state where lifting or lowering of the lift stage 24 is stopped at the above height. At this time, in accordance with which shelf, out of the specific storage shelves 16a and 16b, is a carrying destination of the cargo 10, the top part 42 of the slide arm 28 may pass below the cargo 10 and move from the position in the vicinity of the rack 12b to the position in the vicinity of the rack 12a (or from the position in the vicinity of the rack 12a to the position in the vicinity of the rack 12b). Subsequently, by rotating each of the plurality of hooks 30 to 36 from the retracting position to the protruding position, each of the tips 34a and 36a of each of the pair of hooks 34 and 36 is engaged with the handle 14b of the cargo 10 placed on the pair of cargo placement parts 26 of the lift stage 24.

From this state, the top part 42 of the slide arm 28 is moved from the position in the vicinity of the rack 12a to the position in the vicinity of the rack 12b, and hence the cargo 10 comes to be pressed-in in the X-axis direction by the pair of hooks 34 and 36. Thereby, as shown by an arrow W2 in FIG. 3, the cargo 10 is transferred, while being dragged, from the pair of cargo placement parts 26 of the lift stage 24 to the specific storage shelf 16b. It is to be noted that, when transferring of the cargo 10 is completed, after each of the plurality of hooks 30 to 36 has been rotated from the protruding position to the retracting position, the top part 42 of the slide arm 28 is returned to the standby position. Subsequently, while the lift stage 24 is raised to the vicinity of the travelling vehicle 20, travelling of the travelling vehicle 20 is started.

5. Effects

Next, effects obtained by the transfer device 2 of the present embodiment will be described. As described above, when the pair of hooks 30 and 32 is located in the retracting position, they are arranged so as to be vertically superimposed by falling down sideways in the mutually approaching direction. Hence it is possible to hold down a space occupied by a pair of hooks 30 and 32. As a result, it is possible to ensure a space for placing the cargo 10 on the pair of cargo placement parts 26, so as to transfer even a cargo 10 having a relatively small size. It is to be noted that a similar effect to the foregoing effect can also be obtained in terms of the pair of hooks 34 and 36, and the same applies to an effect that will be described below.

Further, as described above, the tip 30a of the hook 30 is bent stepwise in the transferring direction of the cargo 10 more than the base end 30b of the hook 30. Accordingly, as illustrated in FIGS. 4 and 6, when each of the pair of hooks 30 and 32 is located in the retracting position, the tip 30a of the hook 30 can be escaped from the base end 32b of the hook 32. Similarly, the tip 32a of the hook 32 is bent stepwise in the transferring direction of the cargo 10 more than the base end 32b of the hook 32. Accordingly, when each of the pair of hooks 30 and 32 is located in the retracting position, the tip 32a of the hook 32 can be escaped from the base end 30b of the hook 30. As a result, it is possible to reduce an arrangement interval between the pair of hooks 30 and 32 in the Y-axis direction, so as to further hold down the space occupied by the pair of hooks 30 and 32.

Moreover, as described above, the bulging part 30c and the bulging part 32c are provided at the tip 30a of the hook 30 and at the tip 32a of the hook 32, respectively. Hence it is possible to stably engage each of the tips 30a and 32a of each of the pair of hooks 30 and 32 with the handle 14a (or the handle 14b) of the cargo 10. Furthermore, as described above, when each of the pair of hooks 30 and 32 is located in the retracting position, the bulging part 32c of the hook 32 superimposed on the lower side is arranged facing upward, and the bulging part 30c of the hook 30 superimposed on the upper side is arranged facing downward. Therefore, despite provision of the respective bulging parts 30c and 32c at the tips 30a and 32a of each of the pair of hooks 30 and 32, it is possible to hold down the space occupied by the pair of hooks 30 and 32.

Moreover, as described above, the R-surfaces 30d and 32d are formed at the tip 30a of the hook 30 and at the tip 32a of the hook 32, respectively. Thereby, each of the tip 30a of the hook 30 and the tip 32a of the hook 32 can be deeply engaged with the handle 14a (or the handle 14b) of the cargo 10. Furthermore, it is possible to obtain the following effect due to formation of the R-surface 30d at the tip 30a of the hook 30. Assuming that the R-surface 30d is not formed but a corner is formed at the tip 30a of the hook 30, when the hook 30 is rotated from the retracting position to the protruding position, the corner of the hook 30 comes to be located at a position higher than the position of the handle 14a (or the handle 14b) of the cargo 10 in the Z-axis direction. Thereby, the hook 30 and the handle 14a (or the handle 14b) may interfere with each other to cause the cargo 10 to rise, and the other hook 32 may not be able to be engaged with the handle 14a (or the handle 14b) of the cargo 10. In the transfer device 2 of the present embodiment, by forming the R-surface 30d at the tip 30a of the hook 30, a gap is formed between the R-surface 30d and the handle 14a (or the handle 14b) when the hook 30 is rotated from the retracting position to the protruding position. As a result, it is possible to suppress mutual interference between the hook 30 and the handle 14a (or the handle 14b).

Further, as described above, at the time of rotating each of the pair of hooks 30 and 32 from the retracting position to the protruding position, the controller 52 starts rotation of the hook 32 superimposed on the lower side at the timing in which a predetermined time has elapsed after starting rotation of the hook 30 superimposed on the upper side. Hence it is possible to suppress mutual interference of the pair of hooks 30 and 32 at the time of rotation.

Moreover, the transfer device 2 transfers, while dragging, the cargo 10 between the storage shelf 16 of the rack 12a (or the rack 12b) and the lift stage 24. Hence it is possible to transfer the cargo 10 while supporting a loading weight of the cargo 10 from below by the storage shelf 16 and the lift stage 24. As a result, it is possible to suppress reactive force that is applied from the cargo 10 when the cargo 10 is transferred between the lift stage 24 and the storage shelf 16, so as to suppress swaying of the lift stage 24.

Alternative Embodiment of Invention

Figure 9:
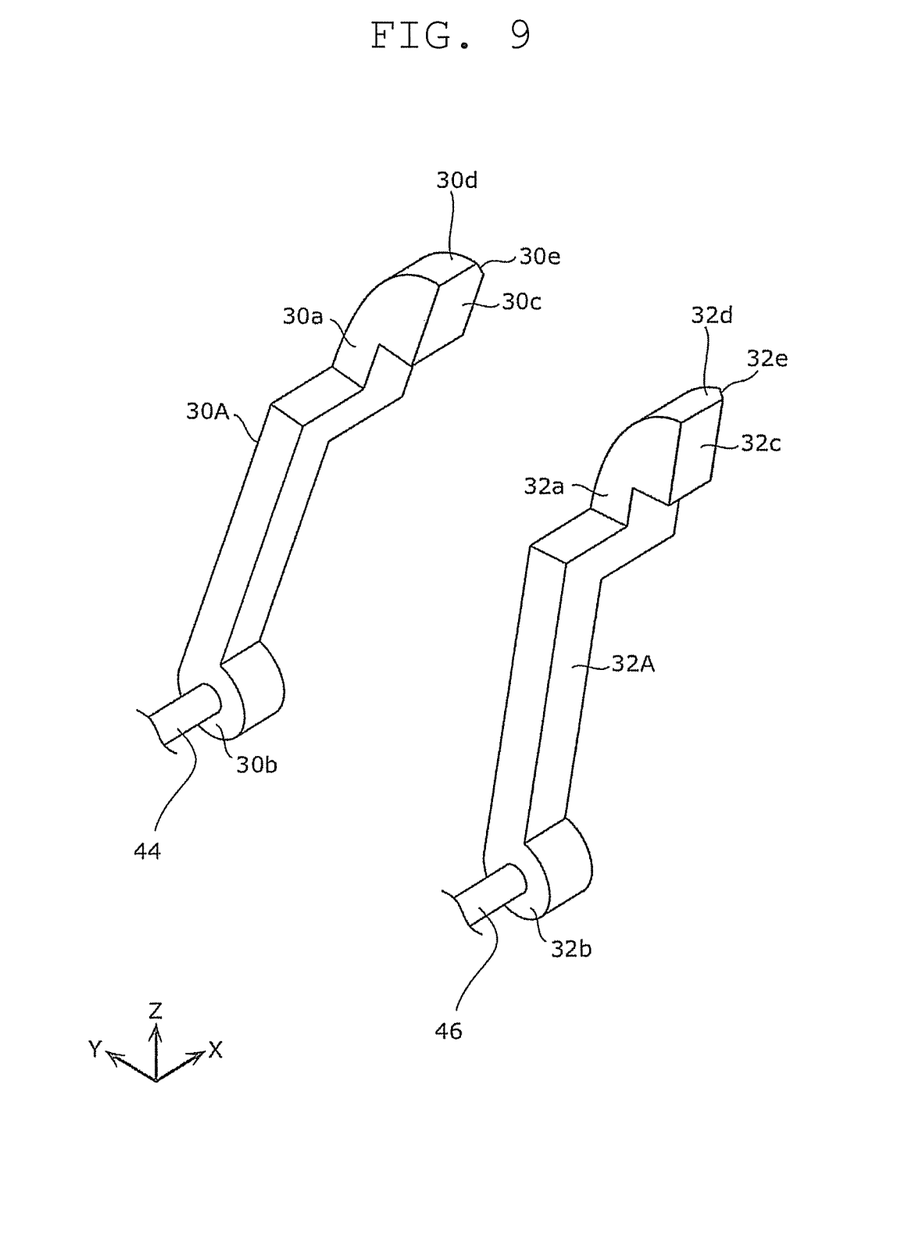
FIG. 9 is a perspective view illustrating a pair of hooks according to an alternative embodiment of the invention.

Next, an alternative embodiment of the invention will be described with reference to FIG. 9. FIG. 9 is a perspective view illustrating a pair of hooks 30A and 32A according to an alternative embodiment of the invention.

In the present alternative embodiment, as illustrated in FIG. 9, a chamfering surface 30e is formed at a corner of an R-surface 30d of a hook 30A. The chamfering surface 30e extends along an extending direction of the corner of the R-surface 30d. Further, a chamfering surface 32e is formed at a corner of a bulging part 32c of the hook 32A. The chamfering surface 32e extends along an extending direction of the corner of the bulging part 32c.

Therefore, at the time of rotating each of the pair of hooks 30A and 32A from the retracting position to the protruding position, for example, even when a position of each of the pair of hooks 30A and 32A is displaced from a position of the handle 14a of the cargo 10, each of the chamfering surfaces 30e and 32e comes to slide on the handle 14a. Hence it is possible to reliably engage each of the hooks 30A and 32A with the handle 14a of the cargo 10.

Other Alternative Embodiments, Etc.

Although the transfer device according to the present invention has been described above based on the embodiments, the present invention is not restricted to the above embodiments. The present invention also includes a mode obtained by applying an alternative conceivable by a person skilled in the art to the above embodiment, and another mode realized by arbitrarily combining the constituents in the above embodiments.

Although the transfer device 2 is mounted in the carrier system 4 in the above embodiment, this is not restrictive, and it may be mounted in a stacker crane or the like, for example.

A transfer device of the present invention can be mounted in a carrier system, a stacker crane, or the like, for example.

What is claimed is:

1. A transfer device for transferring a cargo in a transferring direction, the cargo having an engaged part on a side surface thereof, the device comprising:
    a cargo placement part having a cargo placement surface for placing the cargo;
    a pair of hooks, each of which is rotated around a base end thereof between a protruding position where a tip thereof is engaged with the engaged part by protruding above the cargo placement surface and a retracting position where the tip thereof separates from the engaged part by retracting below the cargo placement surface; and
    a movement mechanism which moves the pair of hooks in the transferring direction with respect to the cargo placement part,
    wherein, when the pair of hooks is located in the retracting position, the hooks are arranged so as to be vertically superimposed by falling down sideways in a mutually approaching direction.

2. The transfer device according to claim 1, wherein the tip of each of the pair of hooks is bent stepwise in the transferring direction more than the base end of each of the pair of hooks.

3. The transfer device according to claim 1, wherein
    a bulging part that bulges toward a direction substantially perpendicular to the transferring direction is provided at the tip of each of the pair of hooks, and
    when each of the pair of hooks is located in the retracting position, the bulging part of the hook superimposed on a lower side is arranged facing upward, and the bulging part of the hook superimposed on an upper side is arranged facing downward.

4. The transfer device according to claim 1, further comprising:
    a controller which controls rotation of each of the pair of hooks,
    wherein at the time of rotating each of the pair of hooks from the retracting position to the protruding position, the controller starts rotation of the hook superimposed on a lower side at the timing in which a predetermined time has elapsed after starting rotation of the hook superimposed on an upper side.

5. A carrier system comprising:
    a rail arranged on a ceiling side;
    a carrier having a travelling vehicle that travels along the rail, and a lift stage that is lifted or lowered while being hung from the travelling vehicle;
    a rack, a cargo being transferred between the rack and the lift stage; and
    the transfer device according to claim 1, which is provided on the lift stage and configured to place the cargo between the lift stage and the rack,
    wherein two sets of pairs of hooks of the transfer device are provided, and the two sets of pairs of hooks are respectively arranged movably on both right and left sides of the lift stage.

* * * * *